United States Patent Office 3,292,895
Patented Dec. 20, 1966

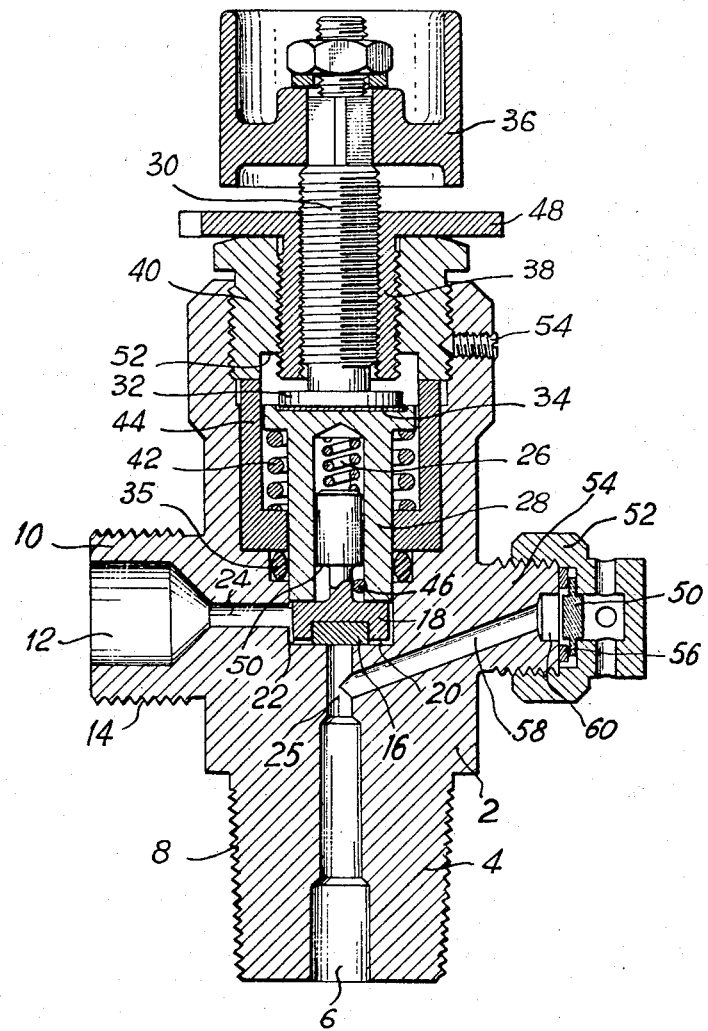

3,292,895
VALVE FOR PRESSURE GAS CONTAINER
André Leger, La Varenne-Saint-Hilaire, and Jack Boursaud, Champigny-sur-Marne, France, assignors to L'Air Liquide, Societe Anonyme Pour l'Etude et l'Exploitation des Procedes Georges Claude
Filed June 18, 1964, Ser. No. 376,091
Claims priority, application France, July 2, 1963, 940,120, Patent 1,370,689
4 Claims. (Cl. 251—83)

The present invention relates to a valve for a pressure gas container, more especially containing a very pure gas or a gas having a very precisely defined composition.

It is necessary to prevent the contents of the container from being fouled by the ambient air when their pressure relative to that of the said air has become very slight, or by the gas under pressure of another container which is connected in parallel with the first-mentioned container. For this purpose, it is known to control the lifting of the valve member or closure member, in normal service, not positively but by means of a spring acting on the valve member support in the direction opposite to the action of the gas pressure within the container on the valve member. When the pressure in the container has become sufficiently slight, it can no longer overcome the force of the spring and the valve can no longer open.

In order to fill the container subsequently, it is necessary to withdraw an abutment which limited the opening movement of the valve during normal service, i.e. the movement which the user can bring about.

The valve according to the present invention, the valve or closure member support of which is subjected to the action of a spring which tends to re-close it in order to prevent gas from escaping during normal service when the gas pressure is less than a certain value, is relatively simple to construct and adjust; it has various advantages over valves of this kind which have already been proposed:

The abutment cannot be inadvertently withdrawn to the point of rising damage to the valve or partial dismantling thereof;

The springs, if they are suitably designed, cannot be completely compressed.

The valve according to the invention is characterised in that the valve member support is moved with some play by a slide member, the spring which tends to re-close the valve member support bearing on the one hand against the valve member support and on the other hand against the slide, and the latter being adapted to bear on the valve member support in the sense of closing the valve, the position of the slide during normal service being adjusted by a screw which is rotated by a control device and being delimited, in the sense of the opening of the valve, by abutment against a first internally and externally screwthreaded part into which the said screw is engaged, the said first part screwing into a second part which is internally and externally screwthreaded and which is screwed into the valve body, the said second part forming an abutment for the travel of the slide when, in order to permit the container to be completely emptied, the said first part has been sufficiently uncrewed.

Preferably, the said first part cannot be manipulated except by a special key.

The accompanying drawing shows a sectional view, diagrammatically and by way of example, a valve according to the invention which is intended to be fixed in the neck of a gas cylinder.

The body 2 of the valve comprises an inlet nozzle 4 having a bore 6 and a screwthread 8 for screwing to a cylinder, and an outlet nozzle 10 with a bore 12 and screwthread 14.

In the closed position, which is the position illustrated, the bore 6 is closed by a valve member 16 made of neoprene, which is applied by the valve member support 18 against a valve member seat constituted by the end wall 20 of the chamber 22. Into this chamber there opens the bore 24 which is a prolongation of the bore 12 and, when the valve is open, the bore 25 which is a prolongation of the bore 6. Neoprene can be replaced by another material which also ensures the achievement of air-tightness simply under the influence of the spring 26, as well as under the force exerted by the screw 30.

The valve closure member support 18 is applied towards the wall 20 by a spring 26 which bears against the bottom of a cavity provided in a slide 28; moreover it is blocked by contact with the slide, as the drawing shows, when the controlling hand wheel 36 has been sufficiently rotated. The slide 28, which guides the spring 26 and the valve member support, is subjected to the pressure of a screw 30; it is separated from the plate 32 which terminates this screw by a disc 34 made of black sheet iron lubricated with molybdenum sulphide or another suitable lubricant, so as to avoid seizing.

A toroidal sealing ring 35 provides air-tightness between the slide 28 and the valve body.

The hand wheel 36 is used for rotating the screw 30. The latter engages with the internal screwthread of a first internally and externally screwthreaded part 38. This part is itself screwed into a second internally and externally screwthread part 40.

A spring 42 bears at one end on the slide and at the other end on a sleeve 44 mounted in the body of the valve. It would also be possible to dispense with this sleeve in which case the spring 42 will bear directly on a bearing surface of the body, particularly if the sealing ring 35 is mounted in a groove of the slide. This spring 42 makes the slide bear against the screw 30.

When, by rotating the hand wheel 36, the screw 30 is unscrewed, the slide yields to the action of the spring 42 and no longer detains the valve member support. If the pressure in the bore 25 is sufficient to overcome the pressure of the spring 26, the valve closure member 16 is lifted and allows the passage of gas from the bore 25 into the chamber 22 and thence into the bore 24.

The movement of the slide in the upward direction in the drawing is bounded by the abutment of the plate 32 on the lower face of the part 38. This limitation prevents complete relaxation of the spring 26, which is calculated to meet this requirement; the lifting of the valve member 16 therefore, necessitates that there should be at least a certain pressure in the bore 6 and therefore in the cylinder. Thus, the user cannot empty the cylinder down to atmospheric pressure, which would run the risk of permitting external air from entering the cylinder and introducing impurities into the said cylinder. The valve member thus arranged forms a non-return valve arrangement and opposes the introduction of gas under pressure by way of the nozzle 14.

In order to permit the cylinder to be filled at the gas supply station, the part 38 is unscrewed by means of a special key which is engaged on to the upper flange 48 of the said part. Since the latter is then displaced upwards in the drawing, the screw 30 can be unscrewed more fully thus permitting the slide 28 to move upwards under the action of the spring 42 and allowing the spring 26 to be completely relaxed.

After a certain travel of the slide, a pin 46 which extends through a hole formed in the slide, abuts on a bearing surface 50 of the stem of the valve member support and forces the valve member support to follow the movement of the slide and therefore to open the through-flow passage for the gas.

Excessive unscrewing of the part 38 must not be allowed to enable the valve member support to issue from the valve body, which would entail a risk of allowing foreign substances to fall into the cylinder. The part 40, by its bearing surface 52, limits the lifting of the slide 28 and therefore the lifting of the valve member support. The presence of the part 40 avoids having to count the revolutions imparted to the flange 48 with the special key; it is then possible to make the slide cover the necessary distance sufficient for the opening of the valve without taking any special precautions.

A pointed screw 54, for example, prevents rotational movement of the part 40.

The represented valve comprises a safety device which may be omitted when regulations do not make it mandatory.

This device essentially comprises a frangible disc 50 which a cap 52 presses on a tubulation 54 of the valve body. A washer 56 keeps the disc in place before it is pressed and afterwards ensures its air-tightness. A bore 58 connects bore 25 with the cavity 60 of tubulation 54.

What we claim is:

1. Valve means for a pressure gas container comprising a valve member, a valve seat opposite said valve member and a valve member support, said valve member support being subjected to the action of a spring which tends to close said valve member against said seat to prevent the escape of gas during normal service when the pressure of the gas is below a certain value, said valve member support being moved through a lost motion connection by a slide, said spring bearing at one end on said valve member support and at the other end on said slide, and said slide being capable of being positioned to bear on said valve member support in the sense of closing said valve member, the position of said slide during normal service being adjusted by a screw which is rotated by a control device and being limited in the sense of the opening of said valve member by abutment against a first internally and externally screwthreaded means into which the said screw is engaged, said first means being screwed into a second internally and externally screwthreaded means which is screwed into the valve body, said second means forming an abutment for the travel of said slide when, in order to permit of completely emptying the container, said first means has been sufficiently unscrewed.

2. Valve means according to claim 1, characterised in that the driving of said valve member support, with play, by said slide is effected by a pin member moved by one of these two elements and extending through an aperture in the other element, the said aperture having, in the direction of the travel of said valve member support, a length which is distinctly greater than the size of the said pin member measured in the same direction.

3. Valve means according to claim 1, characterised in that a second spring mounted in the valve body biases said slide in the valve opening sense.

4. Valve means according to claim 1, characterised by means to prevent rotation of said second screwthreaded means in the valve body.

References Cited by the Examiner
UNITED STATES PATENTS

| | | | |
|---|---|---|---|
| 1,641,892 | 9/1927 | Lane | 251—83 |
| 2,634,748 | 4/1953 | Morrison | 251—83 |
| 2,861,569 | 11/1958 | Emerson | 251—83 |

M. CARY NELSON, *Primary Examiner.*

W. CLINE, *Examiner.*